United States Patent
Taniguchi

(10) Patent No.: US 11,307,553 B2
(45) Date of Patent: Apr. 19, 2022

(54) CONTROL DEVICE AND CONTROL METHOD

(71) Applicant: OMRON Corporation, Kyoto (JP)

(72) Inventor: Takuya Taniguchi, Ritto (JP)

(73) Assignee: OMRON Corporation, Kyoto (JP)

( * ) Notice: Subject to any disclaimer, the term of this patent is extended or adjusted under 35 U.S.C. 154(b) by 65 days.

(21) Appl. No.: 16/644,177

(22) PCT Filed: Oct. 24, 2018

(86) PCT No.: PCT/JP2018/039519
§ 371 (c)(1),
(2) Date: Mar. 4, 2020

(87) PCT Pub. No.: WO2019/107022
PCT Pub. Date: Jun. 6, 2019

(65) Prior Publication Data
US 2021/0063989 A1 Mar. 4, 2021

(30) Foreign Application Priority Data

Nov. 28, 2017 (JP) .............................. JP2017-228120

(51) Int. Cl.
*G05B 19/05* (2006.01)

(52) U.S. Cl.
CPC ........ *G05B 19/05* (2013.01); *G05B 2219/163* (2013.01)

(58) Field of Classification Search
CPC ... G05B 19/05; G05B 2219/163; G05B 15/02
See application file for complete search history.

(56) References Cited

U.S. PATENT DOCUMENTS

| 5,446,453 A * | 8/1995 | Nagamoto | H04W 52/028 340/12.31 |
| 7,356,617 B2 * | 4/2008 | Suzuki | H04J 3/0664 375/356 |

(Continued)

FOREIGN PATENT DOCUMENTS

| EP | 3026515 A1 | 6/2016 |
| JP | 2002-108414 A | 4/2002 |

(Continued)

OTHER PUBLICATIONS

English translation of the International Search Report("ISR") of PCT/JP2018/039519 dated Nov. 20, 2018.

(Continued)

*Primary Examiner* — Charles R Kasenge
(74) *Attorney, Agent, or Firm* — Metrolex IP Law Group, PLLC

(57) ABSTRACT

A control device includes a first processor that acquires a synchronization signal that is generated every first period, and a second processor that generates a second period that is obtained by dividing the first period by n (n≥1), generates a control signal, using a timer, every third period that is obtained by dividing the second period by m (m≥2), where at least one of a plurality of control signals generated in the first period is a control signal that should be synchronous with the synchronization signal, and in a case where occurrence of an error between timings of the synchronization signal and the control signal that should be synchronous with the synchronization signal is detected, the second processor corrects the error by temporarily changing a width of the timer that is to be started at next and later times.

6 Claims, 6 Drawing Sheets

(56) References Cited

U.S. PATENT DOCUMENTS

| | | | | |
|---|---|---|---|---|
| 8,060,677 | B2 | 11/2011 | Rostan et al. | |
| 8,244,423 | B2 * | 8/2012 | Yasuda | G06F 9/52 |
| | | | | 701/22 |
| 8,307,223 | B2 * | 11/2012 | Tae | H01M 10/425 |
| | | | | 713/300 |
| 9,883,474 | B2 * | 1/2018 | Yamada | H04W 56/0035 |
| 10,606,225 | B2 * | 3/2020 | Zhang | H02P 5/46 |
| 2002/0065940 | A1 * | 5/2002 | Suzuki | H04J 3/0664 |
| | | | | 709/248 |
| 2005/0055469 | A1 * | 3/2005 | Scheele | H04J 3/0664 |
| | | | | 713/375 |
| 2006/0197476 | A1 * | 9/2006 | Aoyama | H04L 12/403 |
| | | | | 318/85 |
| 2007/0058929 | A1 | 3/2007 | Chaffee | |
| 2011/0320079 | A1 * | 12/2011 | Yasuda | G06F 9/52 |
| | | | | 701/22 |
| 2016/0095078 | A1 * | 3/2016 | Yamada | H04L 12/437 |
| | | | | 370/242 |

FOREIGN PATENT DOCUMENTS

| | | |
|---|---|---|
| JP | 2003-88184 A | 3/2003 |
| WO | 2015/128981 A1 | 9/2015 |

OTHER PUBLICATIONS

English translation of the Written Opinion("WO") of PCT/JP2018/039519 dated Nov. 20, 2018.

Extended European search report (EESR) dated Jul. 27, 2021 in a counterpart European patent application.

* cited by examiner

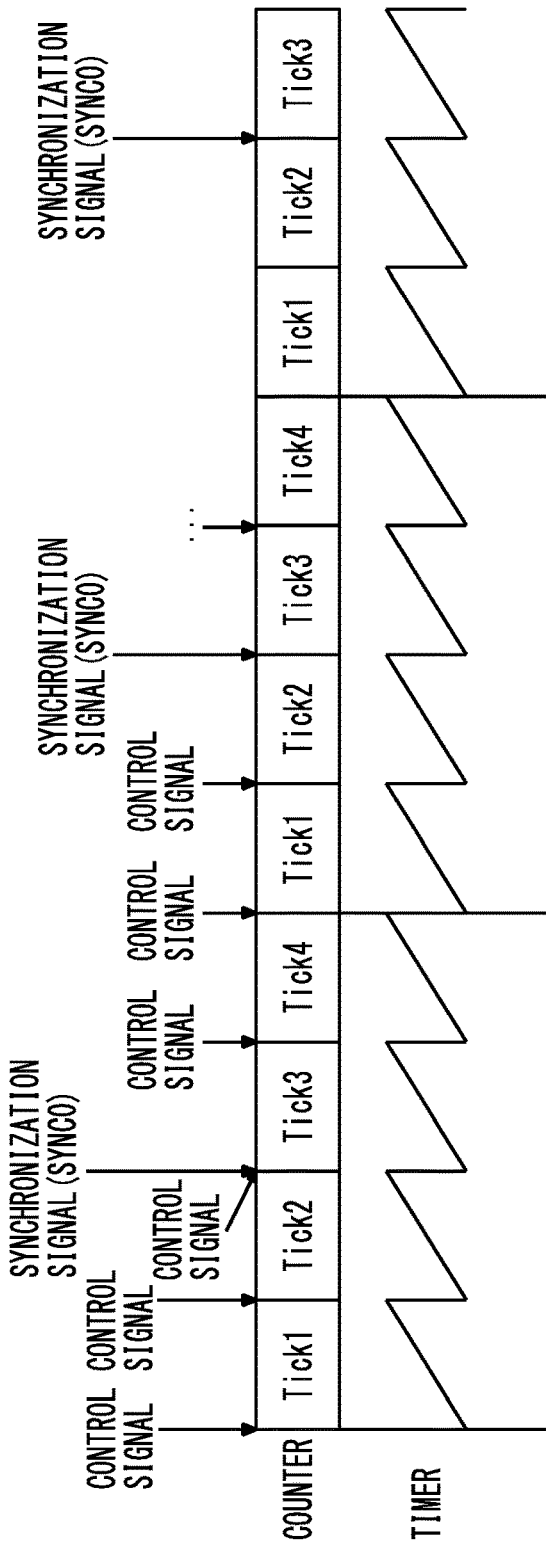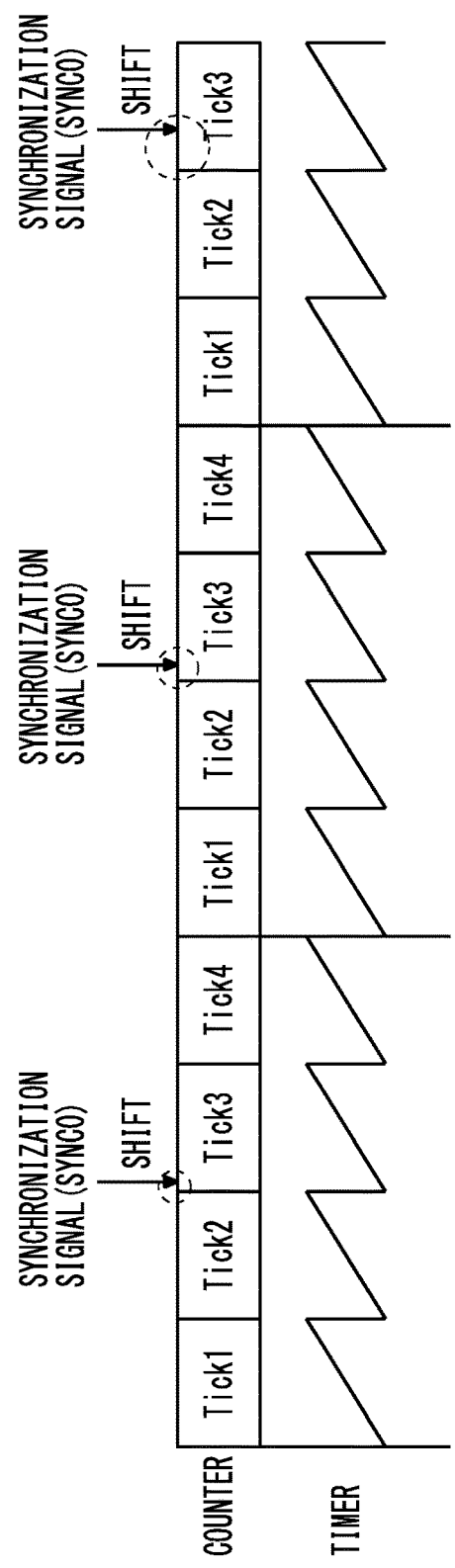
FIG. 2A
FIG. 2B

CONTROL DEVICE AND CONTROL METHOD

TECHNICAL FIELD

The present invention relates to a control device and a control method.

BACKGROUND ART

A programmable logic controller (PLC) is used as a control device that controls a plurality of machines (motors, robots, sensors and the like) included in a production line or the like. Furthermore, a technique of performing communication using an existing standard, such as Ethernet, in a system to which a plurality of control devices are connected is widely used to simplify a system configuration. As such a standard, there is EtherCAT (registered trademark), for example (Patent document 1).

In EtherCAT, a master connected to a network transmits frames to a plurality of slaves, and the plurality of slaves write data for the master in the received frames on the fly. The plurality of slaves may thereby operate in coordination with one another.

EtherCAT includes a function of generating a signal (synchronization signal) for causing processing timings to coincide among the plurality of slaves. By causing the plurality of slaves to perform processing according to the synchronization signal, operations of a plurality of different control target objects (for example, a plurality of motors installed on respective shafts) may be synchronized.

CITATION LIST

Patent Literature

PTL 1: U.S. Pat. No. 8,060,677

SUMMARY OF THE INVENTION

Technical Problem

At each slave in EtherCAT, an MPU that controls the device periodically generates a control signal (interrupt), and the control target object is controlled at a timing according to the control signal. Furthermore, by causing the timings of the control signals to be synchronous with the synchronization signal, operations of a plurality of slaves may be synchronized with each other.

However, because the synchronization signal and the control signal are generated by separate processors, an error may be gradually caused between the timings thereof. If such an error is not corrected, operations cannot be synchronized among the slaves, and thus, each slave has to detect the error in the timing and to correct a generation timing of the control signal.

The present invention has been made in view of such circumstances, and has its object to synchronize, at a control device, a plurality of signals that are periodically generated by separate clocks.

Solution to Problem

A control device according to the present invention includes a first processor that acquires a synchronization signal that is generated every first period, and a second processor that generates a second period that is obtained by dividing the first period by n (n≥1), generates a control signal, using a timer, every third period that is obtained by dividing the second period by m (m≥2), and performs a predetermined process at a timing based on the control signal, where at least one of a plurality of control signals generated in the first period is a control signal that should be synchronous with the synchronization signal, and in a case where occurrence of an error between timings of the synchronization signal and the control signal that should be synchronous with the synchronization signal is detected, the second processor corrects the error by temporarily changing a width of the timer that is to be started at next and later times.

The synchronization signal is a timing signal that is periodically given to the control device, and is acquired by the first processor. In the case where the control device according to the present invention is connected to a master device, the synchronization signal may be periodically transmitted from the master device.

Furthermore, the second processor generates, in the first period, the second period that is 1/n-th the first period, repeatedly generates the control signal in a period (third period) that is 1/m-th the second period, performs a predetermined process at a timing based on the control signal, and thereby controls a control target object. For example, in the case where the control target object is a motor, the control device may communicate with each of a sub-processor that drives the motor, and a sub-processor that performs position detection with respect to the motor. By performing a predetermined process (such as input/output to/from each sub-processor) at each timing of the control signal, control may be performed more finely at timings obtained by further dividing the synchronization signal.

According to such a configuration, because the synchronization signal and the control signal are generated by separate processors, a shift may be caused between the timings of the signals.

Accordingly, in a case where occurrence of an error between the timings of the synchronization signal and the control signal that should be synchronous with the synchronization signal is detected by the second processor, the control device according to the present invention causes the shifted timings to coincide with each other by changing a width of a timer that measures the third period. The timer to be delayed at this time is a timer that is to be started at next and later times. According to such a configuration, the synchronization signal and the control signal may be caused to coincide with each other by a relatively simple configuration.

Furthermore, the second processor may perform correction of the error, in a case where the error is at or greater than a predetermined value.

Because the error in the timings is gradually accumulated, a threshold is desirably provided with respect to the error, and a correction process is desirably performed at a time point when a detected error exceeds the threshold. This is because, if correction is performed very frequently, control signals will not be generated evenly, thereby causing disruption in the operation of the device.

Furthermore, an upper limit may be provided to a width of one change of the timer, and the second processor may change a width of the timer in a divided manner over a plurality of third periods, in a case where the error exceeds the upper limit.

This is because, if the amount of correction is great, the timing of the control signal is drastically changed, and disruption may be caused in the operation of the device due, for example, to detection of an abnormality by a sub-processor. Accordingly, an upper limit is desirably provided with respect to the amount of one correction, and correction is desirably performed in a divided manner over a plurality of periods, in a case where the correction is not completed in one period.

Furthermore, the predetermined process may be a data transmission/reception process that is performed with at least one of a processor that performs drive control of a motor or a processor that acquires position information from the motor.

The present invention may be suitably applied to a device that includes, as sub-processors, a processor that performs drive control of a motor, and a processor that performs position detection of the motor by an encoder or the like.

Furthermore, the second processor does not have to perform correction again until a predetermined period of time passes after correction of the error is performed.

By not performing correction again after performing correction of the error, until operation of a sub-processor is stable, stabilization of the device may be achieved.

Furthermore, the second processor may change a width of the timer that is to be started after a predetermined number of times from a timing when the synchronization signal is to be acquired.

According to such a configuration, correction is performed always at the same timing between the synchronization signals, and thus, an effect on the plurality of sub-processors may be minimized.

Additionally, the present invention may be defined as a control device including at least one of the means described above. Furthermore, the present invention may be defined as a control method that is performed by the control device. The processes and means described above may be freely combined to the extent that no technical conflicts exist.

Advantageous Effects of Invention

According to the present invention, a plurality of signals that are periodically generated by separate clocks may be synchronized with each other at a control device.

BRIEF DESCRIPTION OF DRAWINGS

FIG. 2A is a diagram for describing timings of a synchronization signal and a control signal.

FIG. 2B is a diagram for describing timings of a synchronization signal and a control signal.

DESCRIPTION OF EMBODIMENTS (Example Application)

Hereinafter, an overview of the present invention will be described with reference to the drawings.

Figure 1:
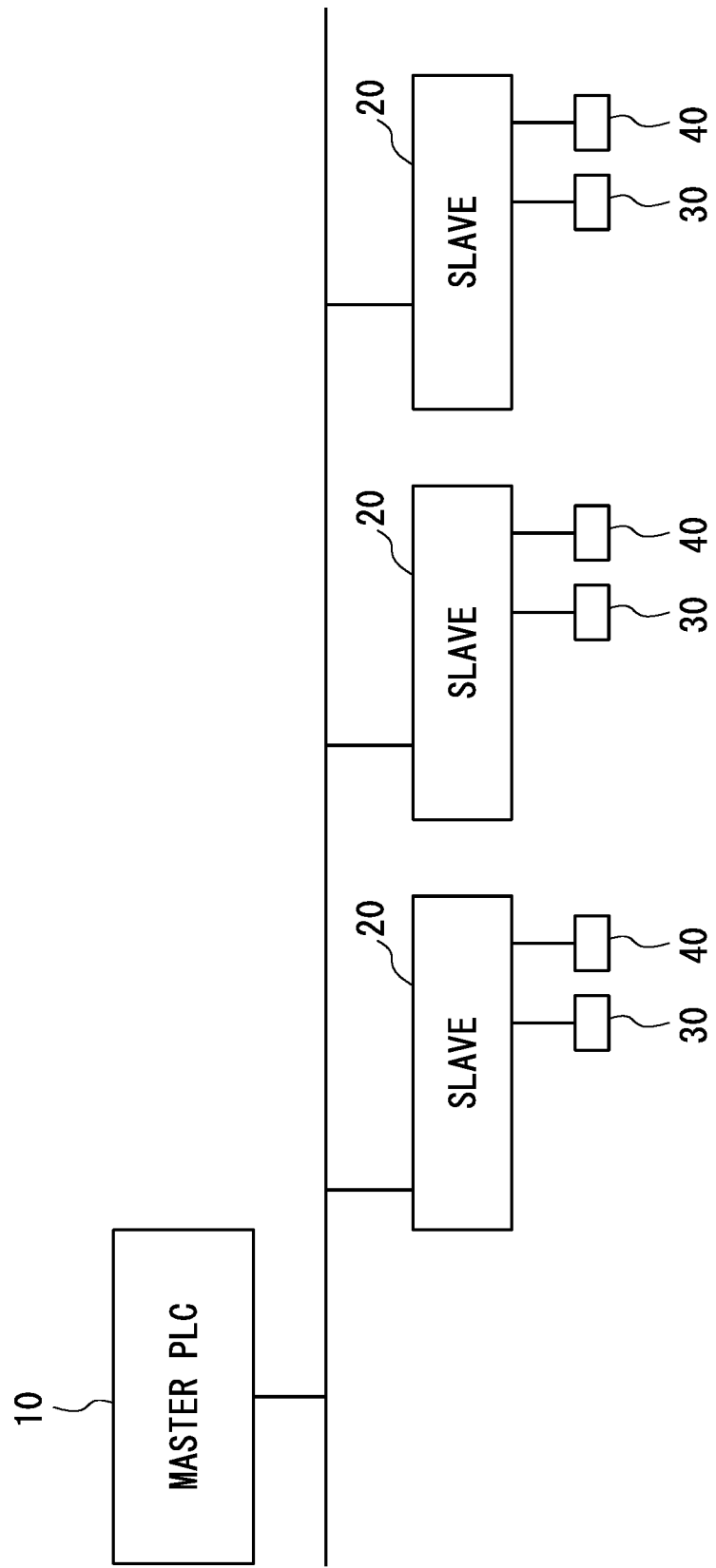
FIG. 1 is an overall configuration diagram of a control system according to an embodiment.

FIG. 1 is a schematic diagram illustrating an overall configuration of a control system according to an embodiment of the present invention. The control system includes a master PLC 10 as a master node, and a plurality of slaves 20 as slave nodes.

The master PLC 10 is a device that controls the plurality of slaves 20 in an integrated manner. Specifically, programs to be executed by the slaves 20 are managed, and operation states of the slaves 20 are monitored, for example.

The slave 20 is a device that is electrically connected to the master PLC 10, a servo motor 30, and an encoder 40, that drives the servo motor 30 according to an instruction received from the master PLC 10, and that acquires position information of the servo motor 30 from the encoder 40 and performs control.

Typically, the slave 20 includes a communication unit that performs network communication, a CPU unit that is a main body that executes programs, and an I/O unit that inputs/outputs signals from fields. The servo motor 30 and the encoder 40 are connected to the I/O unit. The slave 20 drives the servo motor 30 on the basis of an execution result of a program executed by the CPU unit, and acquires a signal from the encoder 40 that outputs the position information of the servo motor 30. Furthermore, current status information is transmitted to the master PLC 10. Additionally, although not illustrated, the CPU unit may include means used for performing input/output (such as a touch panel or a display). For example, information about the operation of the PLC may be provided to users.

The master PLC 10 and the slave 20 are connected to each other by a network such as Ethernet (registered trademark). In the present embodiment, the master PLC 10 and the slave 20 are configured to perform communication using Ether-CAT (registered trademark).

Different servo motors 30 are connected to the plurality of slaves 20, respectively. Additionally, FIG. 1 illustrates an example where one servo motor 30 is connected to one slave 20, but the number of motors connected to the slave 20 may be more than one. In the case where the number of motors connected to the slave 20 is more than one, pieces of information about driving of the servo motors 30 are integrated by the slave to be transmitted to the master PLC 10. Furthermore, FIG. 1 illustrates three slaves 20, but the number of slaves to be connected to the network is not particularly limited.

A synchronization signal is periodically transmitted from the master PLC 10 to the slaves 20. The synchronization signal is a signal for causing processing timings to coincide among the plurality of slaves, and is issued every several hundred microseconds, for example.

Furthermore, at the slave 20, a control signal is periodically generated at a timing synchronized with the synchronization signal. FIG. 2A and FIG. 2B are diagrams for describing a generation timing of the control signal. The slave 20 increments a counter by a built-in timer, and generates the control signal at a timing when the counter is incremented. As illustrated in FIG. 2A, the slave 20 is designed to generate the control signal n times (in the present example, four times) every time the synchronization signal arrives.

According to such a configuration, a shift is sometimes caused between a timing when the synchronization signal is given and a timing when the control signal is generated. This is because a processor that generates the synchronization signal and a processor that generates the control signal are different from each other. For example, as illustrated in FIG. 2B, if correction is not performed, the shift becomes great, and synchronization among the slaves is disrupted.

In the present invention, to correct such a shift, a width of a timer that is started at next and later times is changed in the case where a shift in the timings is detected for the synchronization signal and the control signal, and the shift is thereby corrected.

For example, in the case where a shift is detected at a beginning of Tick3, timers corresponding to following Tick4, Tick1, and Tick2 are temporarily extended or shortened. The timings may thus be made to coincide between the control signal and the synchronization signal that arrives next.

(System Configuration)

In the following, a preferred embodiment of the present invention for implementing the functions described above will be described with reference to the drawings.

Figure 3:
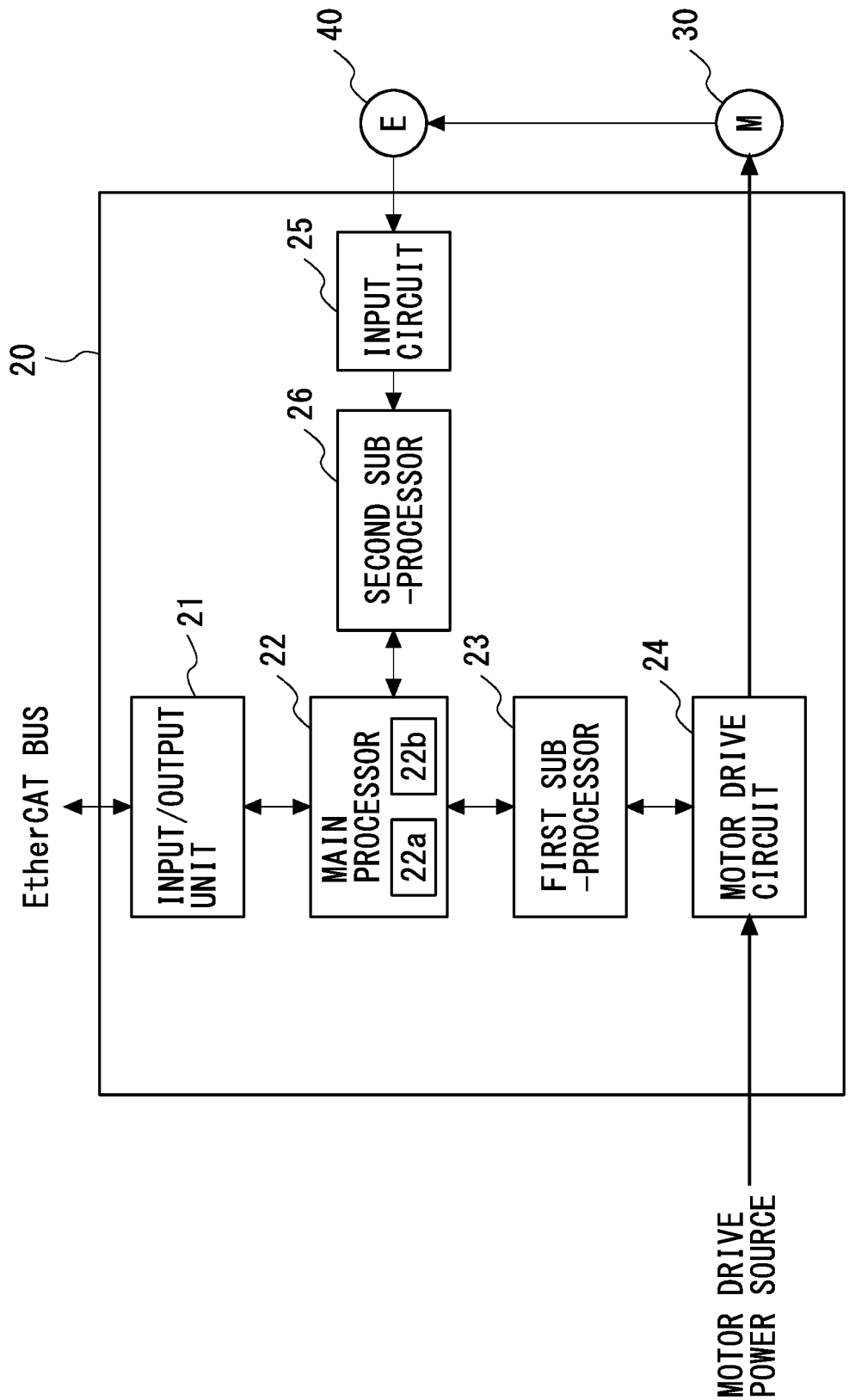
FIG. 3 is a system configuration diagram of a control device according to the embodiment.

FIG. 3 is a system configuration diagram illustrating a control device according to the present embodiment. A control device 20 corresponds to the slave 20 in FIG. 1.

An input/output unit 21 is an interface unit for connecting an EtherCAT bus and a main processor.

A main processor 22 is a main processor that controls the control device 20. The main processor 22 does not necessarily have to be a single processor. For example, there may include a processor (first processor 22a) that is used for communication with EtherCAT, and a processor (second processor 22b) for controlling a control target object (such as a motor or an inverter). Moreover, these processors do not necessarily have to be of one type. For example, one may be implemented by ASIC, and the other by MPU. In the present embodiment, the first processor acquires the synchronization signal, and the second processor generates the control signal, but such a mode is not restrictive.

The control device according to the present embodiment further includes a sub-processor for driving a motor as a control target object, and a sub-processor for acquiring position information of the motor.

A first sub-processor 23 is a sub-processor for driving a motor as a control target object. The first sub-processor 23 controls the motor by transmitting a control signal to a motor drive circuit 24 described later. For example, the first sub-processor 23 is implemented as a microcontroller unit (MCU).

The motor drive circuit 24 is a circuit that is connected to a power source for driving the motor, and that generates a pulse signal for driving the motor, on the basis of the control signal transmitted from the first sub-processor 23.

The motor 30 is a target object to be controlled by the control device 20. In the present embodiment, the motor 30 is a servo motor. Position information (information about a rotation angle) of the motor 30 is detected by the encoder 40 that is built in the motor 30. In the present embodiment, the encoder 40 is an incremental encoder that outputs the position information by a pulse signal.

An input circuit 25 is an interface that acquires, and converts into an internal signal, the pulse signal output by the encoder 40.

A second sub-processor 26 is a processor that counts the internal signals output by the input circuit 25, and that saves an input value by a latch, for example. The second sub-processor 26 is implemented as a microcontroller unit (MCU), for example.

Communication between the main processor 22, the first sub-processor 23, and the second sub-processor 26 is performed through a serial peripheral interface (SPI).

(Signal Correction Method)

Next, a relationship between the synchronization signal and the control signal will be described.

In the present embodiment, the synchronization signal (SYNC0) that is periodically transmitted from the master PLC 10 is acquired by the main processor 22, and the main processor 22 generates, using a timer, the control signal at a timing synchronized with the synchronization signal.

Additionally, in the following description, the synchronization signal is assumed to arrive at an interval of 200 microseconds.

As illustrated in FIG. 2A, the main processor 22 performs counting in periods obtained by dividing an arrival cycle of the synchronization signal into four, by using a timer pulse unit built in the processor. In the present example, a unit of one count is referred to as Tick. That is, four periods from Tick1 to Tick4 are generated every time the synchronization signal arrives. The main processor 22 generates the control signal every time Tick is generated (that is, every time the counter is incremented every 50 microseconds). Additionally, in the present embodiment, a start timing of Tick3 and the timing of the synchronization signal are to be caused to coincide with each other.

Figure 4:
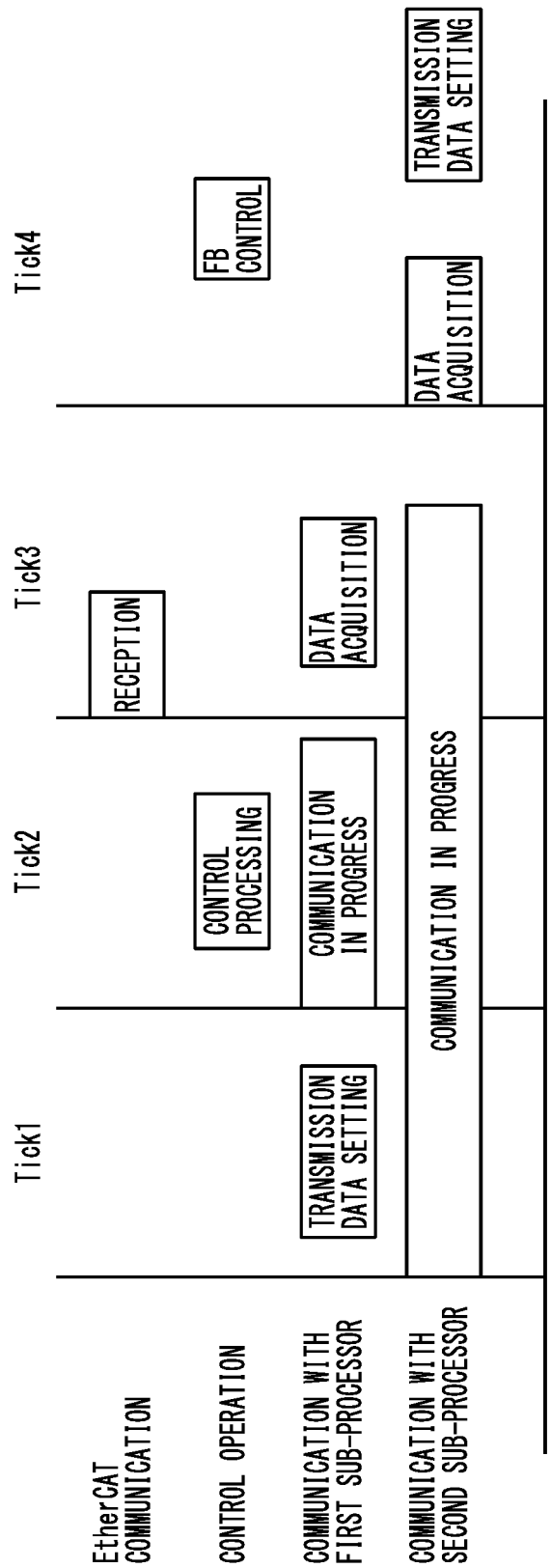
FIG. 4 is a diagram for describing processing contents in each Tick.

Next, contents of processing performed by the main processor 22 in each Tick will be described with reference to FIG. 4. Additionally, here, communication with the master PLC 10 is assumed to be performed in Tick3.

Focusing on the first sub-processor 23, first, transmission data for the first sub-processor 23 is generated in Tick1. Then, communication with the first sub-processor 23 is performed in Tick2, and data transmitted from the first sub-processor 23 is read in Tick3.

Focusing on the second sub-processor 26, in Tick4, data transmitted from the second sub-processor 26 is read and transmission data for the second sub-processor 26 is then generated. Then, communication with the second sub-processor 26 is performed in Ticks 1 to 3.

The control signal that is generated by the main processor 22 is an interrupt signal for the sub-processor. The main processor 22 generates the interrupt signal at a timing of start of each Tick, and each processor performs a predetermined process on the basis of the timing notified of by the interrupt.

Additionally, the processing contents in each Tick and the number of division of Tick described in the present embodiment are merely examples, and may be changed. For example, periods may be generated by dividing the cycle of arrival of the synchronization signal by n (n≥1), and the control signal may be generated in a period obtained by further dividing the period by m (m≥2).

A description will be given by referring back to FIG. 2A and FIG. 2B.

In the case of performing processing by synchronizing Tick and the synchronization signal as in the present embodiment, a shift between the two becomes a problem. This is because the synchronization signal is generated by the master PLC and Tick by the main processor, and even if a timer is set to synchronize the two, an error is gradually accumulated. When the error is accumulated, the synchronization signal and Tick cease to be synchronized with each other, as illustrated in FIG. 2B, and when such an instance occurs among a plurality of slaves, problems such as axes of motors not being in synchronization with each other may occur, for example.

Accordingly, in the present embodiment, in the case where the main processor 22 detects occurrence of a shift in the timings between the synchronization signal and a start time of Tick3, correction of the error is performed by correcting an expiry time of the timer used for counting.

Figure 5:
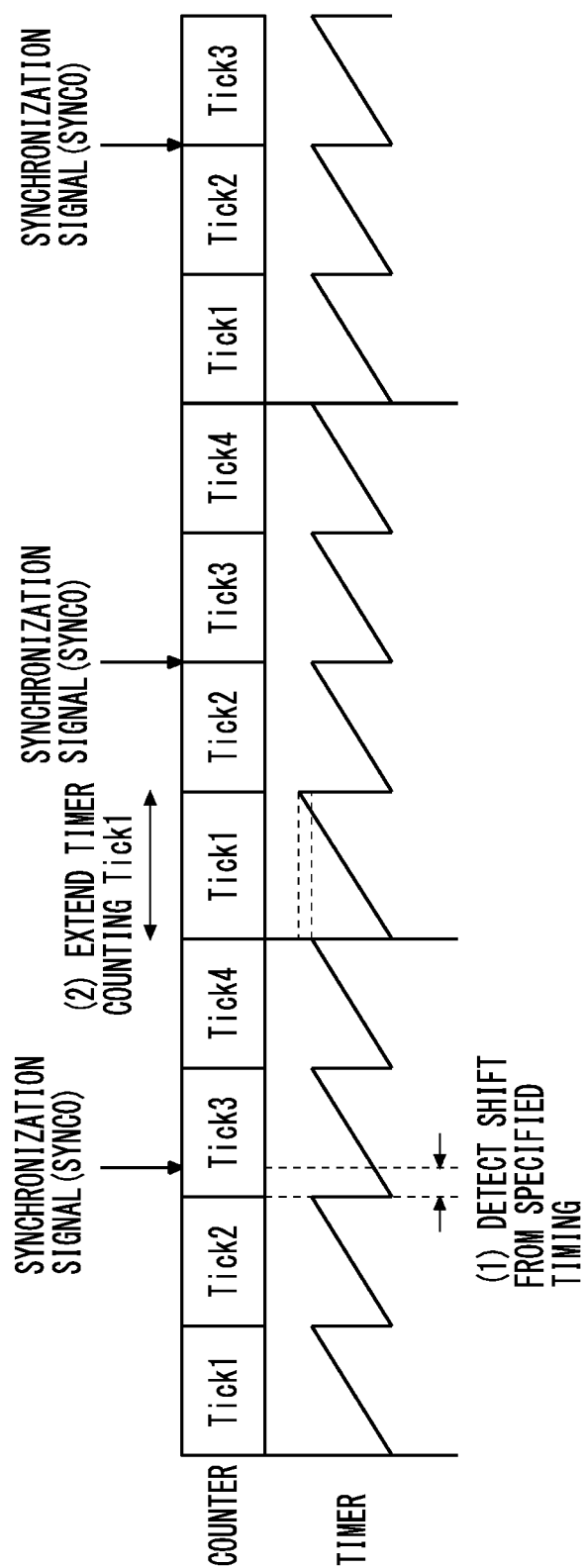
FIG. 5 is a diagram for describing a process of correcting a shift in a timing.

The operation will be described with reference to FIG. 5.

As indicated by (1) in the drawing, every time the synchronization signal is generated, the main processor 22 detects a shift between an arrival timing of the synchronization signal and a generation timing of the control signal in Tick3. If an absolute value of a width of the shift exceeds a predetermined value (hereinafter "first threshold"), correction is determined to be necessary, and a correction process is performed. Additionally, the first threshold may be one microsecond, in a case where the interval between the synchronization signals is 200 microseconds, for example. The first threshold is desirably greater than expected jitter (temporal fluctuations) of the synchronization signal. This is because, if jitter is detected as an error, a correction process that is actually not necessary is performed, and this may cause occurrence of errors at later times.

In the case where correction is determined to be necessary by the main processor 22, the timer measuring Tick is temporarily extended or shortened at Tick1 arriving at a next or later cycle, as indicated by (2) in the drawing. For example, if the synchronization signal is delayed by n microseconds from the control signal, expiry of the timer is delayed by n microseconds. Furthermore, if the synchronization signal is earlier than the control signal by n microseconds, expiry of the timer is shortened by n microseconds. The timings of the synchronization signal and the control signal are thus made to coincide with each other after the Tick in which correction is performed.

Tick, the duration of which is extended or shortened, may basically be any of the four. However, in the case where a length of Tick is changed, an end timing of processing performed in Tick in question and a start timing of processing that is to be performed in subsequent Tick change, and thus, depending on the circumstances, reading of correct data from the sub-processor is possibly prevented. Accordingly, Tick that does not affect transmission/reception of data even if the start time is shifted by the width of correction is desirably selected. In the present embodiment, Tick1 is selected as such Tick.

As described above, in the present embodiment, of the timers executed in quadruplicate, the turn of the timer that is made the target of extension or shortening is fixed (in the present example, the first, or when counted from the synchronization signal, the third).

(Process Flowchart)

Figure 6:
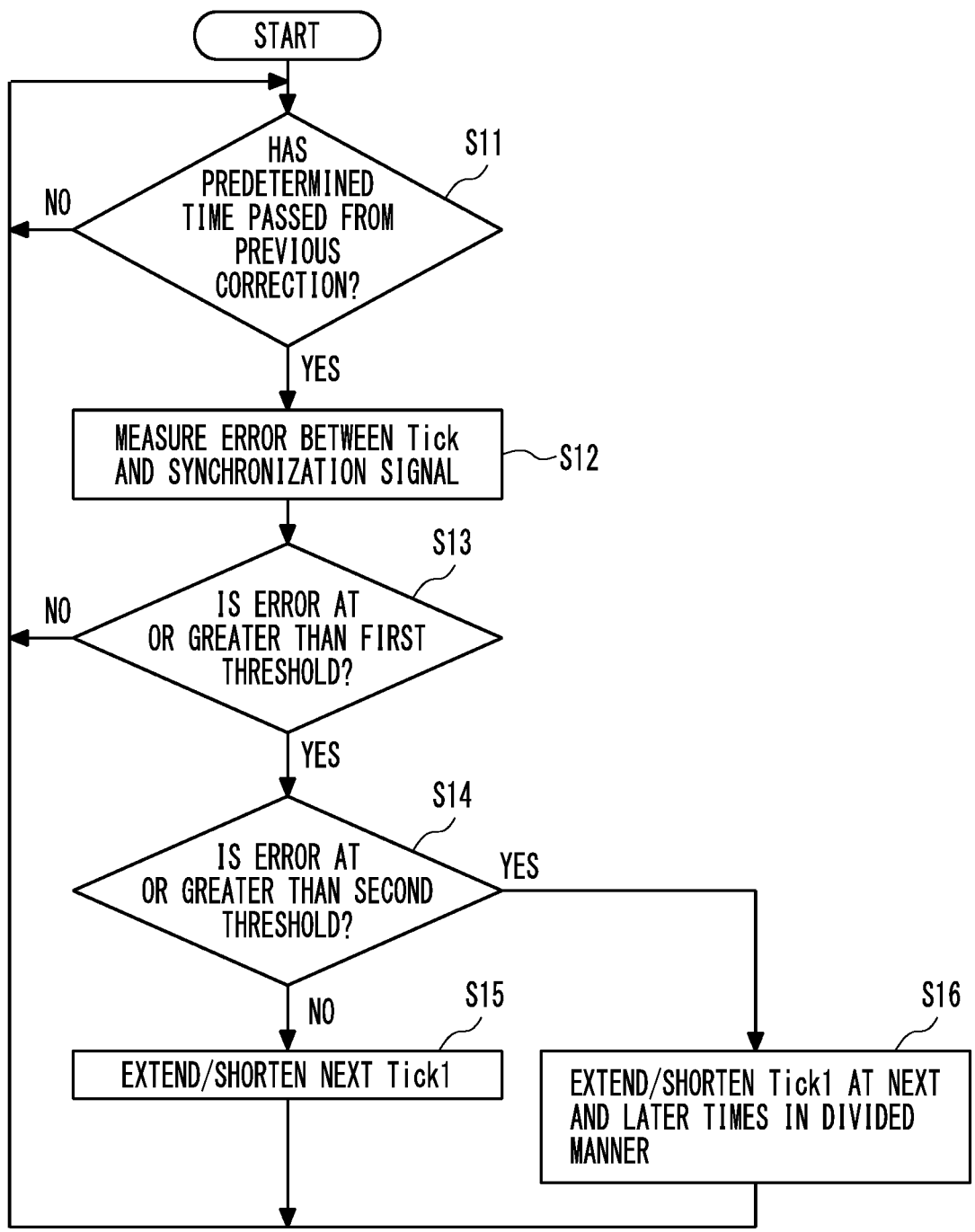
FIG. 6 is a process flowchart performed by the control device according to the embodiment.

Next, a flowchart of the process that is performed by the main processor 22 will be described with reference to FIG. 6. The process in FIG. 6 is repeatedly performed by the main processor 22 while the control device 20 is on.

First, in step S11, whether a predetermined period of time passed from last correction or not is determined. This process is a process for securing an interval between corrections. Additionally, the predetermined period of time may be 50 milliseconds, in the case where the interval between the synchronization signals is 200 microseconds, for example. In the case where the predetermined period of time is not passed, the process returns to an initial state.

In step S12, an error between the start time of target Tick (in the present embodiment, Tick3) and the synchronization signal is measured.

Next, in step S13, whether the error determined by the measurement is at or greater than the first threshold is determined. As described above, the first threshold may be set taking into account fluctuations in the timings of the synchronization signals. In the case where the error is smaller than the first threshold, the process returns to the initial state.

Next, in step S14, whether the error determined by the measurement is at or greater than a second threshold is determined. The second threshold is a value expressing an allowable maximum width of correction in one process. For example, in the case where an allowable width of correction in one process is five microseconds, the second threshold is five microseconds.

In the present embodiment, correction is sequentially performed when an error of a predetermined value or greater is detected in step S13, but because an interval is secured between previous correction and next correction, the error is possibly accumulated during the interval. In the case where the error accumulated during the interval is great, an affirmative determination is made in step S14.

In the case where the error is smaller than the second threshold, the timer measuring Tick1 is extended or shortened in the next period (step S15). As described above, the width of extension/shortening is equal to the error determined in step S12.

In the case where the error is at or greater than the second threshold, the timer measuring Tick1 is extended or shortened in the next and later periods (step S16). Step S16 is different from step S15 in that correction is not completed in one period. That is, the shift is removed by performing correction several times with the second threshold as an upper limit. For example, in the case where the error is 30 microseconds, and the second threshold is five microseconds, correction is performed six times in units of five microseconds. A stable state of the control target object may be maintained by performing correction little by little in such a manner.

As described above, according to the present embodiment, a synchronization signal and a control signal may be synchronized with each other at a control device that generates a control signal (interrupt) on the basis of a synchronization signal, and in which a plurality of processors operate in coordination according to the control signal.

Additionally, in the case where the expiry time of an already started timer is to be changed, that the time of expiry is not yet reached after the change is given as the condition for changing. On the other hand, in the present embodiment, a timer that is not started yet is extended or shortened when a shift between the timings is detected, and thus, correction may be performed with no restrictions.

Furthermore, in the case where a plurality of Ticks are generated between the synchronization signals, correction is always performed taking same Tick as the target, and an effect on the plurality of sub-processors may be minimized.

(Example Modification)

Additionally, the description of the embodiment is only an example used to describe the present invention, and the present invention may be embodied by making changes or combinations within a scope of the present invention.

For example, in the description of the embodiment, the synchronization signal is transmitted from the master PLC every time, but not all the synchronization signals have to be transmitted from the master PLC. For example, the main processor 22 may generate the synchronization signal, and the master PLC may transmit only a signal for correcting the timing.

Furthermore, in the description of the embodiment, a system that controls the servo motor is described as an example, but the control target may be other than the servo motor. For example, the control target may be an inverter. Moreover, the control target does not necessarily have to include a movable portion, and may be a sensing device, a laser device or the like, for example.

Furthermore, in the description of the embodiment, the number of sub-processors is two, but the number of sub-processors may be one or three or more.

The present invention may also be defined in the following manner, that is, as a control device including: a first processor (22a) that acquires a synchronization signal that is generated every first period; and a second processor (22b) that generates a second period that is obtained by dividing the first period by n (n≥1), generates a control signal, using a timer, every third period that is obtained by dividing the second period by m (m≥2), and performs a predetermined process at a timing based on the control signal, where at least one of a plurality of control signals generated in the first period is a control signal that should be synchronous with the synchronization signal, and in a case where occurrence of an error between timings of the synchronization signal and the control signal that should be synchronous with the synchronization signal is detected, the second processor corrects the error by temporarily changing a width of the timer that is to be started at next and later times.

REFERENCE SIGNS LIST 20 control device
21 input/output unit
22 main processor
23 first sub-processor
24 motor drive circuit
25 input circuit
26 second sub-processor
30 motor
40 encoder

The invention claimed is:

1. A control device comprising:
a first processor configured to acquire a synchronization signal that is generated every first period; and
a second processor configured to generate a second period that is obtained by dividing the first period by n, wherein n≥1, generate a control signal, using a timer, every third period that is obtained by dividing the second period by m, wherein m≥2, and perform a predetermined process at a timing based on the control signal, wherein
at least one of a plurality of control signals generated in the first period is a control signal that should be synchronous with the synchronization signal,
in a case where occurrence of an error between timings of the synchronization signal and the control signal that should be synchronous with the synchronization signal is detected, the second processor corrects the error by temporarily changing a width of the timer that is to be started at next and later times, and
an upper limit is provided to a width of one change of the timer, and the second processor changes a width of the timer over a plurality of third periods, in a case where the error exceeds the upper limit.

2. The control device according to claim 1, wherein the second processor performs correction of the error, in a case where the error is at or greater than a predetermined value.

3. The control device according to claim 1, wherein the predetermined process is a data transmission/reception process that is performed with at least one of a processor that performs drive control of a motor or a processor that acquires position information from the motor.

4. The control device according to claim 1, wherein the second processor does not perform correction again until a predetermined period of time passes after correction of the error is performed.

5. The control device according to claim 1, wherein the second processor changes a width of the timer that is to be started after a predetermined number of times from a timing when the synchronization signal is to be acquired.

6. A control method comprising:
acquiring a synchronization signal that is generated every first period; and
generating a second period that is obtained by dividing the first period by n, wherein n≥1, generating a control signal, using a timer, every third period that is obtained by dividing the second period by m, wherein m≥2, and performing a predetermined process at a timing based on the control signal, wherein
at least one of a plurality of control signals generated in the first period is a control signal that should be synchronous with the synchronization signal,
in a case where occurrence of an error between timings of the synchronization signal and the control signal that should be synchronous with the synchronization signal is detected, the error is corrected by temporarily changing a width of the timer that is to be started at next and later times, and
an upper limit is provided to a width of one change of the timer, and a width of the timer is changed over a plurality of third periods, in a case where the error exceeds the upper limit.

* * * * *